United States Patent [19]
Zimmerman et al.

[11] Patent Number: 4,569,976
[45] Date of Patent: Feb. 11, 1986

[54] REDOX CURE SYSTEM FOR ACRYLIC ADHESIVE COMPOSITIONS

[75] Inventors: William D. Zimmerman, Acton; Samuel C. Temin, Needham, both of Mass.

[73] Assignee: The Kendall Company, Boston, Mass.

[21] Appl. No.: 662,472

[22] Filed: Oct. 18, 1984

[51] Int. Cl.$^4$ .................. C08F 4/00; C08F 120/20; C08F 4/40
[52] U.S. Cl. .................................. 526/204; 526/220; 526/323.1
[58] Field of Search ............... 526/204, 205, 220, 317, 526/323.1

[56] References Cited

U.S. PATENT DOCUMENTS

| | | | |
|---|---|---|---|
| 2,139,697 | 12/1939 | Salzberg | 526/220 |
| 2,365,035 | 12/1944 | Yooker | 526/220 |
| 2,380,618 | 7/1945 | Stewart et al. | 526/204 |
| 2,430,591 | 11/1947 | Stewart | 526/204 |
| 3,625,930 | 12/1971 | Toback et al. | 526/220 |
| 4,460,760 | 7/1984 | Okamoto et al. | 526/204 |
| 4,467,079 | 8/1984 | Heckenberger et al. | 526/204 |

Primary Examiner—Harry Wong, Jr.
Attorney, Agent, or Firm—Donald N. Halgren

[57] ABSTRACT

Improved cure system for two-part acrylic adhesive compositions comprising, as a first part, a polymerizable composition of a vinyl, especially acrylate or methacrylate, monomer or monomers, optionally a polymer or oligomer, or a polyfunctional methacrylate and a peroxidic catalyst, and a second part, being an activator containing a monosubstituted thiourea, having a heteroatom in the beta or gamma position relative to the nitrogen bearing the substituent. The disclosed catalyst cure system markedly increases the rate or redox initiated polymerization of the acrylate based adhesives, and gives greater on-part life for the activator.

6 Claims, No Drawings

REDOX CURE SYSTEM FOR ACRYLIC ADHESIVE COMPOSITIONS

BACKGROUND OF THE INVENTION

The present invention relates to improved redox initiating systems for free radical polymerization.

The present invention also relates to improved cure systems for adhesives.

The present invention also relates to improved two-part acrylic adhesives, which may have both structural and non structural applications.

The present invention more particularly relates to an improved two-part acrylic adhesive incorporating an improved activator.

Two-part acrylic adhesives, otherwise known as reactive acrylics or toughened acrylics, are well-known in the art and commerce as useful, high-performance adhesives. A general description of this class of adhesives is given, for example, by A. Bachmann in Adhesives Age, August 1982, pp. 19–23 (June 1979); and by J. A. Graham, chapter 9 in Adhesives in Manufacturing, ed by G. L. Schneberger, Marcel Decker, 1983.

Key factors in performance of adhesives, include resistance to impact and stress, high adhesion to substrates and resistance to environmental hazards. Of further importance is the rate of cure. It is often desirable that the joint parts, one spread with adhesive and the other coated with activator, cure as quickly as possible after being joined together. It is also desirable that the strength of the joint develop rapidly. Further, the more rapid the cure, the less clamp or fixture time required, and, in general, the greater economic advantage being offered, particularly in high volume manufacturing processes. Still further in the case of the two-part acrylics, the useful lifetime, or the "on part life" of the activator is important. It would be desirable to prime, or apply activator, to a surface in anticipation of later assembly, or mating with the opposing, adhesive-coated surface, well in advance of assembly time in order to permit greater facility in manufacturing operations.

The reactive, or two-part acrylic adhesives, largely consist of (a) a monomer/elastomer solution or a monomer/oligomer/polymer solution, containing a free radical initiator, and (b) an accelerator for the initiator. It is common practice to include from about 5 to about 10 percent by weight of an unsaturated carboxylic acid in the adhesive formulation to accelerate cure time and give improved adhesion. A preferred polymerizable acid is methacrylic acid.

The system is cured by polymerization of the monomer(s) or monomer/oligomer mixtures by free radical mechanisms. The free radicals are generated by reaction of the oxidant material, that is, the initiator or catalyst, and the reductant material, that is, the activator. Typically, therefore, the rate of radical generation which, in turn, determines the rate of polymerization or speed of cure, depends upon the nature of the redox reaction.

An early redox reaction, as disclosed in U.S. Pat. No. 3,994,764 consists of benzoyl peroxide (oxidant) and dimethylaniline (reductant). Because of the toxicity of dimethylaniline, a variety of other aromatic amine derivative have been disclosed. In some cases the odor of aromatic amine is unacceptable to the end user. However, the use of less toxic amine reductants does not eliminate the deficiency of an unstable peroxidic material like benzoyl peroxide (BPO). Instability in the peroxide catalyst leads to premature gelation of the adhesive on storage. In practice, BPO is not included in the adhesive portion of the system. In this case, the activator is contained in the monomer solution and the BPO or catalyst solution is separately applied. A more commonly used oxidant is the more thermally stable cumene hydroperoxide (CHP).

As a suitable reductant or activator to be coupled with CHP, condensation products of amines and aldehydes have been used, see e.g. U.S. Pat. No. 3,890,407. Well known commercial activators of this type include a condensate of butyraldehyde and aniline, sold by the R. T. Vanderbilt Company under the trade name VANAX 808 ™, and a butyraldehyde-butylamine condensate sold under the trade name VANAX 833 ™. A related material which is similar to VANAX 833 ™ but which contains a small amount of copper salt is sold by the Loctite Corp. under the designation LOCTITE NF.

An important deficiency of the amine-aldehyde condensation products is oxidative instability. A surface coated with such an activator becomes inactive toward a surface covered with the acrylic adhesive within a matter of hours if left exposed to the air. Accordingly, a more stable activator is much desired in industry.

The use of redox systems containing peroxy compounds in conjunction with thioureas is known in the literature. The thioureas may be used with transition metal ion salts to initiate polymerization; however, the reaction does not occur readily at room temperature.

V. A. Loprev et al [J. Poly. Sci., (Polymer Chem. Ed.), 17,3411–12 (1979)] briefly reviews the subject of oxidant-thiourea systems. He supports the conclusion of previous workers that electron-withdrawing groups accelerate the polymerization process, while electron-donating groups retard it.

An earlier paper by H. Narita et al [Makromol. Chem., 178,3217–20 (1977)] deals with transition metal ions and thioureas as redox initiators. He suggests that any substitution of the hydrogen atom on the amino group decreases the reactivity of the thiourea in initiating polymerization.

There are also several U.S. patents which deal with thioureas as reductants or initiators for two component curing systems. U.S. Pat. No. 3,991,008, assigned to The Kendall Company, discloses monosubstituted thioureas in conjunction with various hydroperoxides, give a good cure system with improved color stability.

U.S. Pat. No. 3,970,505, assigned to Loctite discloses poly-substituted thioureas in conjunction with an acid to give good "cure through volume" characteristics for anaerobic adhesive systems.

U.S. Pat. No. 3,870,675 assigned to Sumitomo Chemical Co. discloses a reductant system consisting of a poly-substituted thiourea with dipyridyl amine and a transition metal salt for accelerating the cure of a two component adhesive system.

An earlier U.S. Pat. No. 3,625,930, also assigned to Loctite discloses mercaptobenzothiazole and thiourea-type compounds as reductants. However, the ability of these compounds to cure through a gap is generally limited to about 3 mils (0.003 inch). This information is also cited in U.S. Pat. No. 3,970,505 (see column 7. line 15 FF).

The technology disclosed in patent U.S. Pat. No. 3,970,505 indicates that mono- and disubstituted thiourea are relatively ineffective in initiating the cure of two component adhesive systems. This patent also teaches that modification of the substituent group on the thiourea component has little or no effect on the activity of that component in a redox reaction, in direct contradistinction to the teaching embodied in the present invention. U.S. Pat. No. 3,970,505 further teaches that salicylic acid significantly accelerates the curing rates in the presence of tetramethyl thiourea.

SUMMARY OF THE INVENTION

The essence of the present invention is the combination of an initiator, or oxidant, with the activator, or reductant, which combination constitutes an improved redox curing system for acrylic adhesives.

The present invention relates to an improved activator for the peroxidic catalyst in an acrylic composition which provides faster curing rates, and greater on-part life and enhanced capability for securing an acrylic adhesive for gap filling applications.

The improved activators of the present invention comprise either Type I monosubstituted thiourea compounds with a heteroatom, i.e., oxygen, nitrogen or sulfur, in a position beta to the nitrogen of the thiourea bearing the substituent, or Type II monosubstituted thioureas comprising an ether oxygen atom in a position gamma to the substituted nitrogen of the thiourea.

The Type I thiourea compounds of this invention conform to the following formula (I):

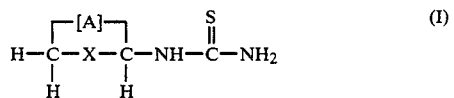

where X is selected from the group consisting of N, O, and S, and the solid line indicates cyclic or ring structures. The cyclic structure can be saturated acyclic, or either aromatic or unsaturated, in which cases at least one of the H atoms are replaced by a double bond to the carbon atoms of the ring.

Additionally, the Type II thiourea compounds of this invention embody an ether oxygen atom in a position gamma to the nitrogen of the substituted thiourea. Type II thioureas exclude compounds wherein the O atom is part of an unsaturated or aromatic ring. The Type II compounds of this invention conform to the following formulae (IIA), (IIB) and (IIC):

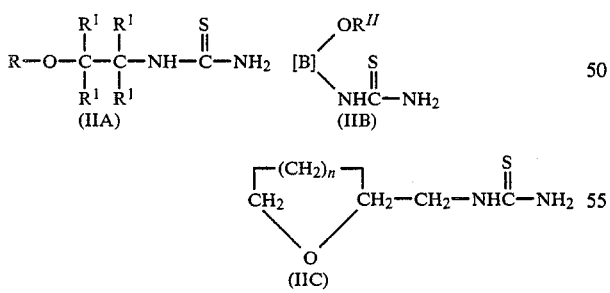

wherein structure (IIA), R=$C_1$ to $C_4$ alkyl, and $R^1$ is either H or $CH_3$, providing that at least 2 $R^1$'s are H. In structure (IIB), [B] is an aromatic or cycloaliphatic ring of 5 or 6 members in the annular ring, and the substituents, i.e. OR and —$NHCSNH_2$, are in positions ortho to each other, or in the 1,2-positions on the ring. $R^{II}$ is $C_1$ to $C_4$ alkyl. In structure (IIC), n is 2 or 3.

These activators, i.e. of Type I and II, used in conjunction with a peroxidic catalyst or free radical initiator, preferably a hydroperoxide, give rise to a more rapid and facile redox reaction causing faster curing rates of the methacrylate monomers of the adhesive.

DESCRIPTION OF THE PREFERRED EMBODIMENT OF THE PRESENT INVENTION

The monosubstituted thiourea compounds of type I of this invention conform to the formula (I):

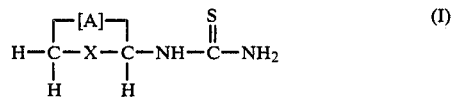

where X is selected from the group consisting of O, N, and S, and the group [A] represents the other portion of a ring or cyclic structure, formed by group [A] in combination with X and the two carbon atoms to which it is attached, of 5 to 6 atoms in the annular ring.

The cyclic structure can be saturated acyclic, or either aromatic or unsaturated, in which cases at least one of the H atoms are replaced by a double bond to the carbon atoms of the ring.

Further, group [A] may comprise 2 or 3 carbon atoms, or comprise carbon atoms and heteroatoms, such as N, O or S, to form heterocyclic systems. In addition, the atoms of the 5 or 6 membered ring may be substituted, provided that no substituents possess an active hydrogen atom. Still further, the substitution of the ring containing the group [A], may be such that the substituents can in themselves constitute a ring, with additional atoms, if necessary, to give rise to fused ring structures.

Representative rings, where all atoms in group [A] are carbon atoms, include furan, thiophene, isopyrrole, pyrone, pyridine, and the like. Representative rings where atoms other than carbon alone are in group [A], include 1,3-isodiazole, 1,2,4-triazole, thiazole, oxazoles, thiazoles, oxadiazoles, pyridiazine, pyrimidine, pyrazine, 1,2,4-triazine, oxazines, oxathiazines, and the like. Preferred activators taken from the monocyclic compounds, i.e. Type I, include 2-pyridyl-, 2,1,4-pyronyl-, 2-furyl-, 2-thiofuryl-, and 2-pyrrolthiourea. Especially preferred is 2-pyridyl thiourea.

Fused ring structures, having the thiourea substituent suitably placed in the ring in a position beta to the ring heteroatom (also described as a 2-thiourea derivative), include benzofuran, benzothiofuran, isobenzoxazole, benzpyrazole, benzisoxazole, benzoxazole, 1,4-benzpyrone, quinoline, tetrahydroquinoline, isoquinoline, tetrahydroisoquinoline, cinnoline, quinazoline, naphthpyridine, benzoxazines, and the like. Preferred activators possessing the fused ring structure, include 2-quinolyl thiourea, 1-isoquinolyl thiourea, and 2-naphthyridyl thiourea.

Preferred embodiments of Type I activators include 2-pyridylthiourea, 2-tetrahydrofuranyl thiourea, 2-pyronyl thiourea, 2-thienyl, 2-thiapyran.

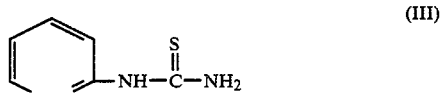

A particularly preferred Type I activator is 2-pyridylthiourea (III). Additionally, the Type II thiourea compounds of this invention embody an ether oxygen atom in a position gamma to the nitrogen of the substituted thiourea. Type II structures exclude compounds wherein the O atom is part of an unsaturated or aromatic ring. The Type II compounds of this invention conform to the following formulae (IIA), (IIB) and (IIC):

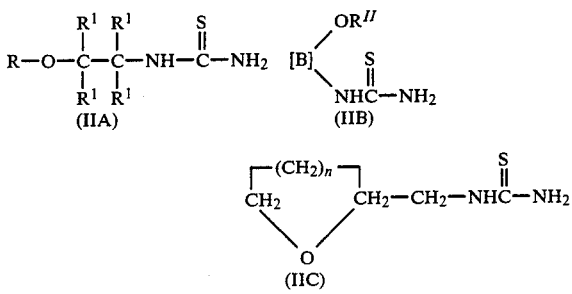

wherein structure (IIA), $R = C_1$ to $C_4$ alkyl, and $R^1$ is either H or $CH_3$, providing that at least 2 $R^1$s are H. In structure (IIB), [B] is an aromatic or cycloaliphatic ring of 5 or 6 members in the annular ring, and the substituents, i.e. OR and $-NHCSNH_2$, are in positions ortho to each other, or in the 1,2-positions on the ring. $R^{II}$ is $C_1$ to $C_4$ alkyl. In structure (IIC), n is 2 or 3.

Type II activator embodiments include: 2-methoxyethyl thiourea, tetrahydrofurfuryl thiourea and ortho-methoxyphenyl thiourea. A preferred embodiment of Type II activators is tetrahydrofurfuryl thiourea (IV).

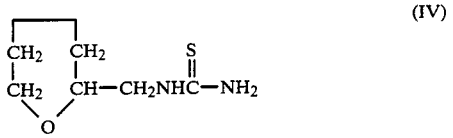

The improved compounds of the present invention function as reductants or activators in systems comprising the activator, separate from the peroxy compound or catalyst contained in the adhesive.

One preferred process embodying this invention involves spraying or coating a surface to be bonded with a solution of the substituted thiourea compounds and then applying another surface to be bonded, already coated with the adhesive, after the solvent is evaporated. In another process, the reductants or accelerators of this invention can be introduced into a stream of adhesive just before the adhesive exits the pumping or delivery device. Conventional machinery exists commercially to blend activator into an adhesive stream just prior to application to the desired surface. As will be seen later, the rapidity of cure with the redox combination of a hydroperoxide and an activator of this invention, requires special precautions, including lower temperatures or low concentrations of activator, to avoid premature gelation of the adhesive mix in the delivery tube or device.

Further, the monosubstituted thioureas of this invention have outstanding stability relative to the aldehyde-amine accelerators of commerce. A thin coating of the compounds of this invention applied to a metal surface, and allowed to dry, retains its activity for several days as a reductant or activator for curing an acrylic adhesive. In contrast, the aldehyde-amine activators of commerce, such as VANAX 833 ™ lose the capability to cure if exposed, as a dried coating, to the air for more than about three hours.

Solvents suitable for dispensing or applying the activator portion of the two-part adhesive are chosen from those that have reasonable solubility for the monosubstituted thioureas, low toxicity, high flash point, and a volatility to conform to the rate of drying desired. Generally, a rapid volatilization of the solvent is preferred. Suitable solvents include 1,1,1-trichloroethane, methylene chloride, methanol, ethanol, isopropanol, acetonitrile, FREON ™, toluene, and mixtures thereof. Particularly preferred are the low-boiling, relatively non-flammable solvents, such as methylene chloride, or its mixtures with 1,1,1-trichloroethane.

The polymerizable portion of the two-part adhesive systems comprises (a) acrylate or methacrylate monomers; (b) an optional elastomeric material which may be polymeric or oligomeric; (c) an intiator or peroxy compound; and (d) other substances, such as, fillers, stabilizers, thickening agents, antioxidants, dyes, and the like.

The acrylate monomers constitute an essential ingredient of the adhesive, in that their polymerization converts the liquid adhesive to a solid. The major components of the acrylate monomer portion of the adhesive are esters of acrylic and methacrylic acids, with preference for the esters of methacrylic acid. These esters may be derived from monofunctional or polyfunctional alcohols, the latter giving rise to and providing for crosslinking. A large number of monomers, both monofunctional and polyfunctional, are available commercially and well known to those skilled in the art. A choice from this broad category of monomers is dependent upon end use application requirements, substrates to be bonded, viscosity required, and similar requirements.

Typical monofunctional monomers include, methyl methacrylate, hydroxyethyl methacrylate, tetrahydrofurfuryl methacrylate, trimethyl cyclohexyl methacrylate, cyclohexyl methacrylate, methacrylic acid, isobornyl methacrylate, ethoxyethyl methacrylate, dicyclopentenyl oxyethyl methacrylate, and non-acrylates such as N-vinyl pyrrolidone and vinyl acetate. Typical polyfunctional monomers include, methacrylate esters of polyethylene glycols, such as the esters of triethylene glycol, 1,6-hexane diol, propylene glycol, 1,3- and 1,4-butylene glycol, and 1,12-dodecanediol.

Similarly, a number of elastomers, can be employed depending upon end use applications, process viscosity, and other end use considerations. The level of such an additive, relative to the amount of monomer, also effects performance and properties of the adhesive, and will vary from about 5 percent to about 60 percent by weight of the total reactive mixture, although a range of from about 15 percent to about 30 percent by weight of the total reactive mixture is preferred for most commercial adhesives.

Typical elastomeric agents include: natural and synthetic rubbers, such as chlorosulfonated polyethylenes, butadiene-acrylonitrile copolymers, triblock copolymers, such as Shell's Kraton ™ series, linear thermoplastic polyurethanes, and ethylene-acrylate copolymers series, i.e. VAMAC ™ series, as well as oligomers, which are vinyl-terminated compounds derived from epoxy resins or diisocyanates reacted with hydroxyl-terminated low molecular weight entities. The oligomers are preferably terminated with methacryloyl or acrylylol groups. In a typical synthesis, the precursor molecule, containing epoxy or isocyanate terminal groups, is reacted with an hydroxyalkyl methacrylate. Again, the particular additive selected, and the concentration level that it is used in the formulation, depends on many factors such as the viscosity required during dispensing and the properties desired after curing.

The third critical component of the polymerizable portion, to be contacted later with the activator, is a peroxygen compound or free radical initiator.

The essence of the present invention is the combination of an initiator, or oxidant, with the activator, or reductant, which combination constitutes an improved redox curing system for acrylic adhesives.

The preferred initiators for use in combination with the monosubstituted thioureas of this invention are hydroperoxides such as cumene hydroperoxide, t-butyl hydroperoxide, diisopropylbenzene hydroperoxide, p-methane hydroperoxide, 2,5-dimethylhexane, 2,5-dihydroperoxide, and the like. For reasons of economics and availability, cumene hydroperoxide is especially preferred. Additionally, blends of hydroperoxides with peresters, such as t-butyl perbenzoate, or t-butyl-peroxymaleate, can be advantageously employed. The level of initiator used may vary from about 1 to about 10 percent by weight, with levels of from about 2 to about 4 percent by weight preferred.

The Type I monosubstituted thioureas of the present invention are, as pointed out earlier, those with a heteroatom in a position beta to the substituted nitrogen, that is, having the structure:

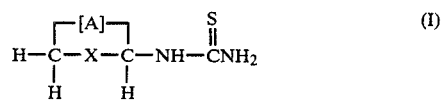
(I)

where X is an atom, selected from the group consisting of O, N, and S. It is postulated, although we do not wish to be limited by this mechanism, that the enhanced reactivity of the cyclic thioureas occurs because of formation of a thermodynamically favored ring incorporating hydrogen bonding to the heteroatom. The "enol" form of the thiourea, sometimes also referred to as an isothiourea, structure (V), is believed to be the reactive component of the redox system.

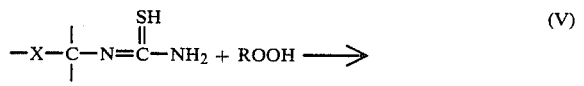
(V)

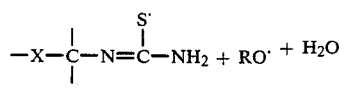

Hydrogen bonding, while forming a thermodynamically favored six-membered ring, see structure (VI), is the

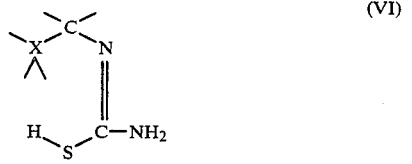
(VI)

driving force to accentuate "enol" formation.

Further, it is postulated that heteroatoms involved in the ring formation, as exemplified in the case of 2-pyridyl thiourea, have electrons more available, on steric grounds, for forming the postulated hydrogen bonds. Consequently, it is to be expected that the beta heteroatom thioureas, where the heteroatom is part of a stable ring or cyclic structure, will be the most active in promoting the redox reaction leading to free radical generation.

The enhanced reactivity of Type II thioureas cannot derive, obviously, from similar mechanisms being operative. Speculation relative to explanation of their behavior is not being offered at this time.

Comparison of curing times, (see Examples) using various reductants or activators with polymerizable masses containing hydroperoxide, utilized a crossed glass slide technique. In the procedure, a glass slide coated with activator is placed at right angles to a glass slide coated with polymerizable mass or adhesive. The slides are rotated back and forth through approximately a ±45° angle several times, for approximately 5 seconds, to ensure good mixing of activator and initiator. A stop watch is started as soon as the two coated surfaces are brought together. The fixture time is recorded as the time when resistance to movement of the mated slides becomes difficult. This fixture time test serves to compare or evaluate activators or curing systems and also gives an indication of when a bonded assembly can be moved or handled in industrial practice. In the tables (see Examples) that follow the fixture times recorded are the average of three tests.

EXAMPLE I

Comparison of Monosubstituted Thioureas

A model acrylic cure system, consisting of a 3 percent solution of cumene hydroperoxide in triethylene glycol dimethacrylate, was applied to a glass slide. To a second glass slide was applied, with a cottom swab, a solution of the thiourea dissolved in a 1:1 mixture of methanol and acetonitrile. The concentrations of each solution were 0.33 molar, equivalent to a 5 percent by weight solution of 2-pyridylthiourea.

After permitting the solvent to evaporate, the two glass slides were then brought together, as described above, and the fixture times determined. Results are shown below in Table 1.

TABLE 1

| Thiourea | Fixture Time (Seconds) |
|---|---|
| 2-Pyridyl | 45 |
| 2-Methoxyethyl | 113 |
| Acetyl | 220 |
| Tetramethyl | >2200 |

It can be seen that the thioureas of Type I are markedly superior to the tetramethyl thioureas of industry.

EXAMPLE II

Comparison of Monosubstituted Thioureas in the Presence of Methacrylic Acid

The procedure of Example I was followed except that the polymerizable mass contained 10 percent by weight of methacrylic acid. Results are shown below in Table 2.

| Thiourea | Fixture Time (Seconds) |
|---|---|
| 2-Pyridyl | 16 |
| 2-Tetrahydrofurfuryl | 27 |
| 2-Methoxyethyl | 36 |

-continued

| Thiourea | Fixture Time (Seconds) |
| --- | --- |
| 2-Methoxyphenyl | 49 |
| Methoxymethyl | 60 |
| Tetramethyl | 65 |
| 2-Furfuryl | 78 |

Note, that although the cure time is reduced in the presence of methacrylic acid, the superiority of the thioureas of the present invention is clearly demonstrated.

EXAMPLE III

Fixture Times in the Presence of Salicylic Acid

The procedure of Example I was followed, except that the activator solution here contained one percent by weight of salicylic acid. Even using the prior art salicylic acid reported useful with tetramethyl thiourea, the preferred embodiment of the present invention is superior to the prior art, as shown in Table 3 below.

TABLE 3

| Thiourea | Fixture Time (Seconds) |
| --- | --- |
| 2-Pyridyl | 36 |
| Tetramethyl | 180 |

EXAMPLE IV

Comparison of Polymerization Rates Induced by Various Thioureas

In this example, the more rapid free radical generation capability of the redox curing system using a thiourea of Type I was demonstrated by noting the time required to gel a monomer mixture. The mixture was prepared by blending one monomer containing cumene hydroperoxide, and one monomer containing a thiourea activator or reductant. The initiator-containing monomer was comprised of triethylene glycol dimethacrylate, with four percent by weight of cumene hydroperoxide. The activator-containing monomer solution was comprised of N-vinyl-pyrrolidone with various thioureas, all at 0.17 molar concentration.

Equal volumes of the two monomers solutions were poured into small vials, mixed, and the time noted for the polymerization to proceed to the point that the material was no longer fluid, i.e. gel time. Results are shown in Table 4 below.

TABLE 4

| Thiourea | Gel Time (Seconds) |
| --- | --- |
| 2-Pyridyl | 70 |
| Acetyl | 500 |
| 3-Pyridyl | 650 |
| t-Butyl | >800 |

EXAMPLE V

Activator Stability Comparison

The stability of reductant or activators can be tested by coating one of the two surfaces to be mated with the activator, and exposing that surface to ambient atmospheric exposure before contacting with the surface coated with adhesive.

The adhesive, or polymerizable mass, for this experiment comprised 85.5 parts triethyleneglycol dimethacrylate, 10.4 parts methacrylic acid, and 4.1 parts cumene hydroperoxide.

The solutions containing the activators shown below in Table 5, were applied to an unprimed steel panel, 1×4×0.063 inches, using a cotton swab. The coated panels were then left exposed to air under ambient conditions for 3 days. The aged panels or strips were then joined to a similar steel strip coated with the adhesive, and following the methods used in Example I for glass slides, the fixture time was determined. The results are shown below in Table 5.

TABLE 5

| | Fixture Time (Seconds) | |
| --- | --- | --- |
| Activator | (Freshly Applied) | (After 3 Days) |
| 2-Pyridyl thiourea | 24 | 24 |
| Tetramethyl thiourea | 48 | >1200 |
| Vanax 808 | 180 | >1200 |

The results here clearly demonstrate the superior on-part life or stability of the improved thioureas of the present invention relative to the tetramethyl thiourea claimed in the prior art, or to the commonly used commercial aldehyde-amine condensate.

EXAMPLE VI

Curing Time of Structural Adhesives

An adhesive composition was prepared that consisted of:
Hydroxyethyl methacrylate: 63 parts by weight
Methacrylic acid: 10 parts by weight
Triethyleneglycol dimethacrylate: 4 parts by weight
Thermoplastic polyurethane: 20 parts by weight
Cumene Hydroperoxide: 3 parts by weight The fixture time on glass slides was also determined as in Example 1, using various activators with the results shown in Table 6 below.

TABLE 6

| Activator | Fixture Time (Seconds) |
| --- | --- |
| 2-Pyridyl thiourea[a] | 35 |
| Tetramethyl thiourea[b] | 55 |
| Acetyl thiourea[c] | 65 |
| Vanax 808[d] | 480 |

[a]5 percent solution in 1:1 methylene chloride-methyl ethyl ketone (MEK).
[b]4.3 percent solution in 1:1 methanol-acetonitrile.
[c]3.8 percent solution in 1:1 methylene chloride: (MEK).
[d]Commercial product, 15 percent solids in 1,1,1-trichloroethane.

EXAMPLE VII

Comparison of Gap-Filling Characteristics

A fixture time test was carried out using the materials and procedure of Example II, except that 2 pieces of 10 mil Nichrome wire were interposed between the glass slides in order to obtain a spacing or gap between the two glass surfaces of 10 mils (0.25 mm). The results are shown in Table 7 below.

TABLE 7

| | Fixture Time of Cure Systems at 10 mil gap (0.025 mm) |
| --- | --- |
| Primer | Fixture Time (Seconds) |
| 2-Pyridyl thiourea | 75 |
| Tetramethyl thiourea | 510 |

The superiority of the activators of the present invention relative to the thioureas claimed by others in gap filling ability is clearly demonstrated.

We claim:

1. A curable two-part adhesive composition, comprising:
   (1) a first part, comprising a solution of at least one polymerizable acrylic or methacrylic ester, and a free radical initiator; and
   (2) a second part, comprising an activator, said activator comprising as the major active ingredient a monosubstituted thiourea, having the following formula (I):

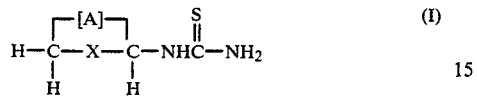

in which X is a heteroatom, selected from the group consisting of N, O, and S, and the group [A] comprises a chain of two to three atoms of which one may be nitrogen, oxygen or sulfur and the remainder are carbon atoms.

2. An adhesive composition as described in claim 1, wherein said activator is dispersed or dissolved in a suitable volatile organic solvent.

3. An adhesive composition as described in claim 1, wherein said activator is 2-pyridyl thiourea.

4. A curable two part adhesive composition comprising:
   (1) a first part, comprising a solution of at least one polymerizable acrylic or methacrylic ester, and a free radical initiator; and
   (2) a second part, comprising an activator, said activator comprising as the major active ingredient a monosubstituted thiourea, selected from the group consisting of tetrahydrofurfuryl thiourea, 2-methoxyethyl thiourea and orthomethoxyphenyl thiourea.

5. An adhesive composition as described in claim 4, wherein said activator is dispersed or dissolved in a suitable volatile organic solvent.

6. An adhesive composition as described in claim 4, wherein said activator is tetrahydrofurfuryl thiourea.

* * * * *